(12) United States Patent
Dai

(10) Patent No.: US 8,510,099 B2
(45) Date of Patent: Aug. 13, 2013

(54) METHOD AND SYSTEM OF SELECTING WORD SEQUENCE FOR TEXT WRITTEN IN LANGUAGE WITHOUT WORD BOUNDARY MARKERS

(75) Inventor: Neng Dai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 12/746,889

(22) PCT Filed: Dec. 4, 2009

(86) PCT No.: PCT/US2009/066753
§ 371 (c)(1),
(2), (4) Date: Jun. 8, 2010

(87) PCT Pub. No.: WO2010/077572
PCT Pub. Date: Jul. 8, 2010

(65) Prior Publication Data
US 2011/0252010 A1    Oct. 13, 2011

(30) Foreign Application Priority Data
Dec. 31, 2008   (CN) .......................... 2008 1 0192934

(51) Int. Cl.
*G06F 17/27*   (2006.01)
(52) U.S. Cl.
USPC .............. 704/9; 704/1; 704/2; 704/8; 704/10; 704/257; 715/264
(58) Field of Classification Search
USPC ......... 704/1–10; 715/264
See application file for complete search history.

(56) References Cited

U.S. PATENT DOCUMENTS

| | | | |
|---|---|---|---|
| 4,750,122 A * | 6/1988 | Kaji et al. .......................... | 704/1 |
| 5,806,012 A | 9/1998 | Maki et al. | |
| 5,806,021 A | 9/1998 | Chen et al. | |
| 6,311,152 B1 | 10/2001 | Bai et al. | |
| 6,374,210 B1 | 4/2002 | Chu | |
| 6,546,401 B1 | 4/2003 | Iizuka et al. | |
| 6,640,006 B2 | 10/2003 | Wu et al. | |
| 6,671,856 B1 * | 12/2003 | Gillam .......................... | 715/210 |
| 6,694,055 B2 * | 2/2004 | Wu .............................. | 382/185 |
| 6,731,802 B1 | 5/2004 | Kacmarcik et al. | |
| 6,738,519 B1 | 5/2004 | Nishiwaki | |
| 6,879,951 B1 | 4/2005 | Kuo | |
| 6,904,402 B1 | 6/2005 | Wang et al. | |
| 6,968,308 B1 | 11/2005 | Brockett et al. | |

(Continued)

OTHER PUBLICATIONS

Nie, On Chinese Text Retrieval, 1996, ACM SIGIR, pp. 225-233.*

(Continued)

*Primary Examiner* — Lamont Spooner
(74) *Attorney, Agent, or Firm* — Lee & Hayes, PLLC

(57) ABSTRACT

The present disclosure discloses a method and apparatus of selecting a word sequence for a text written in a language without word boundary in order to solve the problem of having excessively large computation load when selecting an optimal word sequence in existing technologies. The disclosed method includes: segmenting a segment of the text to obtain different word sequences; determining a common word boundary for the word sequences; and performing optimal word sequence selection for portions of the word sequences prior to the common word boundary. Because optimal word sequence selection is performed for portions of word sequences prior to a common word boundary, shorter independent units can be obtained, thus reducing computation load of word segmentation.

20 Claims, 2 Drawing Sheets

U.S. PATENT DOCUMENTS

| | | | |
|---|---|---|---|
| 7,177,795 B1 * | 2/2007 | Chen et al. | 704/9 |
| 7,424,421 B2 * | 9/2008 | Okumura | 704/8 |
| 7,464,024 B2 | 12/2008 | Luo et al. | |
| 7,478,036 B2 * | 1/2009 | Shen et al. | 704/9 |
| 7,917,350 B2 * | 3/2011 | Mori et al. | 704/2 |
| 7,917,355 B2 * | 3/2011 | Wu et al. | 704/10 |
| RE43,082 E * | 1/2012 | Gutowitz | 341/22 |
| 2002/0003898 A1 | 1/2002 | Wu | |
| 2002/0114515 A1 | 8/2002 | Hotta et al. | |
| 2004/0086179 A1 | 5/2004 | Ma et al. | |
| 2004/0117184 A1 | 6/2004 | Privault et al. | |
| 2006/0015326 A1 * | 1/2006 | Mori et al. | 704/9 |
| 2007/0118356 A1 * | 5/2007 | Badino | 704/10 |
| 2007/0162272 A1 * | 7/2007 | Koshinaka | 704/9 |
| 2007/0282592 A1 * | 12/2007 | Huang et al. | 704/9 |
| 2008/0147405 A1 | 6/2008 | Qing et al. | |
| 2008/0221863 A1 * | 9/2008 | Liu et al. | 704/2 |
| 2008/0228463 A1 * | 9/2008 | Mori et al. | 704/2 |
| 2009/0055168 A1 * | 2/2009 | Wu et al. | 704/10 |
| 2009/0150145 A1 | 6/2009 | Magdalen et al. | |
| 2010/0145676 A1 * | 6/2010 | Rogers | 704/9 |

OTHER PUBLICATIONS

Meknavin et al, Feature-Based Thai Word Segmentation, 1997, Proceeding of the Natural language processing Pacific Rim Symposium, pp. 1-6.*

Palmer, A Trainable Rule-based Algorithm for Word Segmentation, 1998, ACL, '98, pp. 321-328.*

Zhang et al, Chinese Segmentation with a Word-Based Perceptron Algorithm, 2007, ACL, vol. 45 No. 11, pp. 840-847.*

Chinese Office Action mailed Feb. 12, 2010 for Chinese patent application No. 2008101929344, a counterpart foreign application of U.S. Appl. No. 12/746,889, 6 pages.

* cited by examiner

METHOD AND SYSTEM OF SELECTING WORD SEQUENCE FOR TEXT WRITTEN IN LANGUAGE WITHOUT WORD BOUNDARY MARKERS

RELATED APPLICATIONS

This application is a National Stage of International Application No. PCT/US09/66753, filed Dec. 4, 2009, entitled "METHOD AND SYSTEM OF SELECTING WORD SEQUENCE FOR TEXT WRITTEN IN LANGUAGE WITHOUT WORD BOUNDARY MARKERS", claiming priority from Chinese patent application No. 200810192934.4, filed Dec. 31, 2008, entitled "METHOD AND SYSTEM OF SELECTING WORD SEQUENCE FOR TEXT WRITTEN IN LANGUAGE WITHOUT WORD BOUNDARY MARKERS", which are hereby incorporated in their entirety by reference.

TECHNICAL FIELD

The present disclosure is generally related to a field of textual information processing and, more particularly, to selecting a word sequence for text written in language without word boundary markers.

BACKGROUND

Among languages and texts over the world, one type of languages, such as English and German, has word boundary markers and generally uses a space as a boundary marker to divide between words. Another type of languages includes languages without word boundary marker, such as Chinese, Japanese and Korean, in which no delimiter exists between words within a sentence. As computer technology develops, applications such as search engine, text search and machine translation all involve the issue of text processing. Therefore, how to segment a sentence into words and phrases has become a primary concern.

For ease of description, the Chinese language is used as an example for illustration, although the following description applies to similar languages other than the Chinese language. Chinese word segmentation technology has been around for several decades. As early as the 1980's, people have started to investigate how to use computer to automatically segment Chinese terms. Word segmentation refers to the process of identification of each meaningful term from a sentence composed thereof.

One example of Chinese word segmentation includes word matching. Terms in a given string of Chinese words are matched to corresponding terms in a dictionary (or lexicon). When a match cannot be found in the dictionary for a given term, the term is further segmented into individual words, or Chinese characters. Accordingly, simple word segmentation can be completed. Thereafter, word sequences can be formed.

For example, a sentence such as "中国航天官员应邀到美国与太空总署官员开会" can be processed as described above by looking up a dictionary. In particular, this sentence can be segmented into the terms of "中国-航天-官员-应邀-到-美国- 与-太空-总署- 官员-开会" (English translation of the terms: China-aerospace-officials-are invited-to-U.S.-to meet with-space-agency-officials). However, this approach may fail when ambiguity exists. For example, "发展中国家" may be mistakenly segmented into "发展-中国-家" (English translation of the terms: develop-China-home) while the correct answer is "发展-中-国家" (English translation of the terms: developing-country). As another example, "上海大学城书店" may be mistakenly segmented into "上海大学-城-书店" (English translation of the terms: Shanghai University-town-bookstore) while the correct answer is "上海-大 学城-书店" (English translation of the terms: Shanghai-College Town-bookstore).

In order to solve the problem of ambiguity, all possible word sequences need to be considered. In one of the examples above, the phrase "发展中国家" can be segmented into the two word sequences of "发展-中国-家" and "发展-中-国家". Consequently, in this case, certain optimization rules of selecting a word sequence is needed to select the latter as the optimal word sequence.

A maximum matching method known as MMSEG is a simple algorithm of selecting an optimal word sequence based on a number of rules such as largest term matching and maximum average word length. Another comparatively more sophisticated method is a statistical language model proposed by Dr. Jin Guo of Tsinghua University during the 1990's.

The statistical model computes probabilities of occurrence of a sentence upon word segmentation and reckons a word sequence having the highest probability to be the optimal word sequence. Simply put, a probability of occurrence of a sentence refers to a product of probabilities of each term, given the occurrence of respective terms prior thereto. For the first word sequence in the above example, its probability is the probability of having started with "发展" multiplied by the probability of having "中国" behind "发展" and further multiplied by the probability of having "家" behind "发展" and "中国". This method of selecting an optimal word sequence has proven to be accurate and effective.

However, this simple and effective approach of word segmentation has a relatively serious problem. That is, when a sentence is very long, a larger variety of word sequences exist. If all possible word sequences are exhaustively listed and probabilities of the sentence in each possibility are computed, computational load may be tremendous. Not only does the statistical model face this problem, other methods of selecting an optimal word sequence also encounter the problem of excessively large computational load.

SUMMARY

In order to solve the problem of having excessively large computational load when selecting an optimal word sequence in an event a large variety of word sequences exist in existing technologies, exemplary embodiments of the present disclosure provides a computer-implemented method of selecting a word sequence for a text written in a language without word boundary marker. The method includes:

segmenting a segment of the text to obtain different word sequences, where each word sequence includes at least one word segmentation unit that is different from word segmentation units included in other word sequences;

determining whether a position of a word boundary after a word segmentation unit in one word sequence is the same as a position of a word boundary after a word segmentation unit in another sequence, and reckoning the same positioned word boundary to be a common word boundary for the word sequences; and performing optimal word sequence selection for portions of the word sequences before the common word boundary, where the portions of the word sequences before the common word boundary separately includes at least one word segmentation unit that is different from word segmentation units in portions of other word sequences before the common word boundary.

The exemplary embodiments of the present disclosure further provides a computer implemented system of selecting a word sequence for a text written in a language without word boundary marker, which includes:

a word segmentation processing module, used for segmenting a segment of the text to obtain different word sequences, where each word sequence separately includes at least one word segmentation unit that is different from word segmentation units in other word sequences;

a word boundary determination module, used for determining whether a position of a word boundary after a word segmentation unit in one word sequence is the same as a position of a word boundary after a word segmentation unit in another sequence, and reckoning the same positioned word boundary to be a common word boundary for the word sequences; and a word sequence selection module, used for performing optimal word sequence selection for portions of the word sequences before the common word boundary, where the portions of the word sequences before the common word boundary separately includes at least one word segmentation unit that is different from word segmentation units in portions of other word sequences before the common word boundary.

As illustrated in the specific implementation scheme provided in this disclosure, a word boundary is usually generated at a punctuation that divides between sentences, thus easily obtaining shorter independent units. For sentences having a number of ambiguities (e.g., a sentence having three common word boundaries be created because of having three sources of ambiguity), respective computation load will be reduced. If a term in a dictionary includes punctuation, a word boundary may not be generated at the punctuation, thus avoiding incorrect word segmentation. Moreover, requirement(s) for merging is/are easily met. Word sequences may be merged as long as same boundaries on the right hand side exist for word segmentation units. The requirement for merging is more accurate. Because the smallest units segmented by the word boundaries are independent, merging is performed among the smallest units for all word sequences. Not only is this reasonable, it is also plausible without ignoring any possibly correct word segmentations.

DETAILED DESCRIPTION

In order to facilitate understanding of and implementations by a technical person in the art, schemes are described using exemplary embodiments in the present disclosure. First, certain terms used in the exemplary embodiments of the present disclosure are explained. A word boundary refers to a position that is between neighboring words in a sentence but not stridden over by a word, including the beginning and the end of the sentence. For example, the sentence "中国航天官员应邀到美国与太空总署官员开会" is segmented into the collection of sentence segments, or terms, of "中国–航天–官员–应邀–到–美国–与–太空–总署–官员–开会" through word matching. The collection of the terms "中国–航天–官员–应邀–到–美国–与–太空–总署–官员–开会" is called a word sequence while matched terms such as "中国" and "航天" are referred to as word segmentation units. A string of Chinese words that cannot be matched is segmented further into individual words that are also called word segmentation units. Word segmentation units obtained upon word matching are in turn appended to word sequence(s). All of the dash signs in the above sentence denote the word boundaries within the sentence. The disclosed embodiments use a dash sign to illustrate a word boundary and should not be limited thereto.

As multiple word sequences appear due to word ambiguities, a number of word boundaries appear in the sentence. For example, the two word sequences of "上海大学城书店" can have two different word boundaries, namely: "上海大学–城–书店" and "上海–大学城–书店". An operation of merging word sequences is based on a concept of common word boundaries. In this example, there is a common word boundary for these two word sequences prior to the term "书店".

Evidently, if a sentence has punctuations that cannot form a word, e.g., a comma, word boundaries must exist on the left and right hand sides of this comma in all word sequences. Similarly, common word boundaries must exist at positions where no ambiguity exists.

The sentence "上海大学城书店" is used as an example below to explain the function of common word boundaries in word sequence merging. This sentence has two word sequences, or more accurately, two word sequences before the common word boundary (i.e., prior to the term "书店"). Because the word boundary before the terms "书店" is a common word boundary for these two word sequences, this indicates that portions before and after the word boundary are mutually independent. As such, an optimal word sequence prior to the word boundary may be selected. A completely same result can be obtained for selecting an optimal word sequence prior to the word boundary and for selecting an optimal word sequence with "书店" being included.

Therefore, the operation of merging word sequences using a common word boundary can be defined as follows: in the course of word segmentation, if a common word boundary appears, all word sequences prior to the word boundary are merged to select an optimal word sequence while word segmentation continues after this word boundary.

Figure 1:
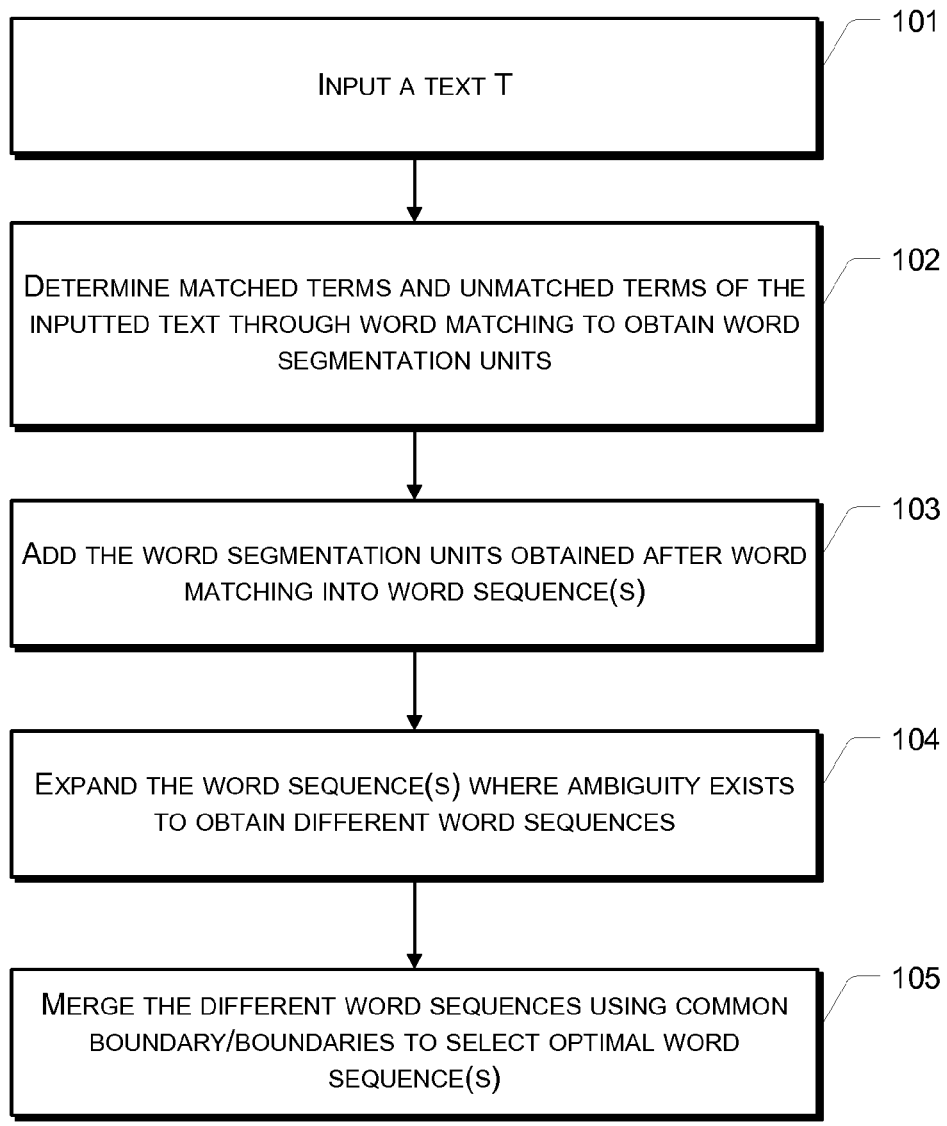
FIG. 1 shows a flow chart of a process in accordance with one embodiment.

FIG. 1 illustrates a computer-implemented process 100 of selecting a word sequence for a text written in a language without word boundary marker. The process 100 includes the following actions:

At 101, a segment of a text T is inputted.

At 102, matched terms and unmatched terms in the inputted text T are determined through word matching to obtain word segmentation units.

At 103, the word segmentation units obtained after word matching are appended to word sequence(s).

At 104, at a position where ambiguity exists, the word sequence(s) is/are expanded to obtain various word sequences.

At 105, the various word sequences are merged through a common boundary and optimal word sequence(s) is/are selected.

For illustrative purpose, an example of a search engine is used below to explain the process 100. The following description is also applicable to applications such as text search and machine translation.

At 101, an inputted text T is received through an interface before a search is performed by the search engine. A segment of the text T may include: $S_1S_2S_3S_4S_5S_6S_7$, where each of $S_1$-$S_7$ separately represents a single word.

At 102, a word segmentation processing module of the search engine scans the segment of the text T from left to right once (scanning herein is made from left to right because words are typically expressed from left to right in normal texts; if words are expressed from right to left in a text, scanning will be made from right to left therein), and compares word groups in a lexicon (having a large number of pre-stored word groups) therewith. A term is matched if a word group in the lexicon corresponding to the term is encountered. For example, through word matching, the word segmentation processing module obtains "$S_1S_2$" as an unmatched term, "$S_3S_4S_5S_6$" as a matched term, "$S_3S_4$" and $S_5S_6$" as matched terms and "$S_7$" as an unmatched term. Here, a matching rule refers to performing subsequent word matching after the first word of a matched term obtained in previous word matching or, alternatively, after an unmatched word obtained in previous word matching. In one embodiment, if a matched term "$S_1S_2$" is obtained as a word segmentation unit after the first word matching (where the first word matching begins from the first word "$S_1$" in the segment of the text T), new word matching then begins after "$S_1$".

In another embodiment, if a single word "$S_1$" is obtained as a word segmentation unit after the first word matching, new word matching will begin after "$S_1$". If a term such as "$S_2S_3$" is matched after "$S_1$" of the text T, a third word sequence may exist in subsequent procedures.

A summary of the process of word matching is described as follows:

1. The word segmentation processing module finds matched terms from a lexicon (or dictionary) word after word.

2. When the word segmentation processing module finds a matched term, subsequent word matching will begin with the first word after the matched term. If no matched term is found by the word segmentation processing module, subsequent word matching will begin after the particular word of concern.

3. The word segmentation processing module repeats the above two steps of term matching from the beginning of the sentence until the end of the sentence.

The above method of consulting a dictionary/lexicon for word segmentation to obtain various word segmentation units is merely a preferred scheme according to one embodiment. The present disclosure is not limited thereto. For example, an Internet search engine may be used to perform a search for the inputted segment of the text T to obtain a variety of word segmentation units.

At 103, the word segmentation processing module first establishes a preliminary word sequence collection for addition of word segmentation units. The preliminary word sequence collection is initially an empty collection without word segmentation unit. After 102, the word segmentation processing module adds word segmentation units obtained thereby to the preliminary word sequence collection to track word sequences obtained thus far.

During this addition process, if the word segmentation processing module finds that a matched term is located after all the matched terms of a word sequence, the word segmentation processing module adds the newly found matched term to that word sequence. If the word segmentation processing module finds that the matched term does not appear after all the matched terms of any one word sequence, the word segmentation processing module will create a new word sequence. For example, the word segmentation processing module first adds the word segmentation unit "$S_1S_2$" to the preliminary word sequence collection to obtain a word sequence "$S_1S_2$". Because the word segmentation unit "$S_3S_4S_5S_6$" is positioned after the word segmentation unit "$S_1S_2$", "$S_3S_4S_5S_6$" is appended to that word sequence to obtain a word sequence: "$S_1S_2$-$S_3S_4S_5S_6$". Moreover, as the word segmentation unit "$S_3S_4$" is positioned after "$S_1S_2$", "$S_3S_4$" may be appended to the word sequence "$S_1S_2$". However, because "$S_3S_4$" is not positioned after the word segmentation unit "$S_3S_4S_5S_6$", "$S_3S_4$" cannot be appended to the word sequence "$S_1S_2$-$S_3S_4S_5S_6$". As such, the word segmentation processing module creates a new word sequence: "$S_1S_2$-$S_3S_4$".

In one embodiment, rules of appending word segmentation units are as follows:

1. If the word segmentation processing module finds that a new word segmentation unit appears after all word segmentation units of a word sequence, this word segmentation unit will be appended to that word sequence.

2. If the word segmentation processing module finds that a new word segmentation unit does not appear after all word segmentation units of any one word sequence, a new word sequence is added with this new word segmentation unit.

In another embodiment, a word segmentation unit is added when multiple word sequences exist. After the word segmentation processing module obtains two word sequences "$S_1S_2$-$S_3S_4S_5S_6$" and "$S_1S_2$-$S_3S_4$", for example, the word segmentation processing module appends the word segmentation unit "$S_5S_6$" to the word sequence "$S_1S_2$-$S_3S_4$" to obtain a word sequence "$S_1S_2$-$S_3S_4$-$S_5S_6$".

During the procedure of expanding a word sequence at 104, the number of word sequence(s) is increased not only in a situation where the word segmentation processing module cannot append a new word segmentation unit to existing word sequence(s), but also in a situation where multiple word segmentation units are created at the same position and branches are generated from a word sequence at that time.

As illustrated in the above example, the word sequence "$S_1S_2$" is the original word sequence. The word segmentation units "$S_3S_4$" and "$S_3S_4S_5S_6$" are new word segmentation units generated from the same position. These two new word segmentation units are separately expanded from the original word sequence "$S_1S_2$", resulting in the word sequences "$S_1S_2$-$S_3S_4$" and "$S_1S_2$-$S_3S_4S_5S_6$", respectively. The word segmentation processing module also appends the word segmentation unit "$S_5S_6$" to "$S_1S_2$-$S_3S_4$" to obtain the word sequence "$S_1S_2$-$S_3S_4$-$S_5S_6$".

In reality, the above procedure refers to a process of addition of a new word segmentation unit to an original word sequence by the word segmentation processing module. One difference is as follows: when multiple word segmentation units are added at one time, the word segmentation processing module duplicates the original word sequence.

During the procedure of merging word sequences at 105, a word boundary determination module determines word boundaries in each of the above word sequences by looking for "-" in respective word sequences. Moreover, based on the position of the word found before "-" in the entire text, the word boundary determination module determines the position of that particular "-". In one embodiment, the word boundary determination module may determine that the "-" which is located after "$S_1S_2$" is at the second position, for example, if this "-" is positioned after the second word "$S_2$" in the entire text. Alternatively, the word boundary determination module may determine that the "-" is positioned at the third position because this "-" is located before the third word "$S_3$". The rules for merging word sequences using a word boundary will be described below.

Upon finding that several word sequences have a word boundary at the same position, the word boundary determination module notifies a word sequence selection module to merge word sequences that appear before that word boundary in the original sentence or phrase. Specifically, when the position of a word boundary after a word segmentation unit in one word sequence is the same as the position(s) of word boundary/boundaries after certain word segmentation unit(s) in other word sequence(s), the word boundary determination module determines that this word boundary is a common word boundary for these word sequences. For example, for the word sequences "$S_1S_2$-$S_3S_4$-$S_5S_6$-$S_7$" and "$S_1S_2$-$S_3S_4S_5S_6$-$S_7$", the "-" located after "$S_1S_2$" is a common word boundary for these two word sequences (with both at the second position) while the "-" located after "$S_5S_6$" and "$S_3S_4S_5S_6$" is also a common word boundary for these two word sequences (with both at the sixth position).

In one embodiment, if the word boundary determination module observes that the positions of word boundaries after the last word segmentation units in word sequences obtained after expansion of a word sequence are the same, the word boundary determination module notifies the word sequence selection module that these word sequences can be merged. For example, in the course of expanding a word sequence at 104, the word sequence "$S_1S_2$" is the original word sequence. Word segmentation units "$S_5S_6$" and "$S_3S_4S_5S_6$" are the last matched terms separately along two different paths with positions of respective word boundaries thereafter being the same. The word boundary determination module then notifies the word sequence selection module that these word sequences can be merged into one. Upon receiving notification, the word sequence selection module may select the word sequence "$S_1S_2$-$S_3S_4S_5S_6$-$S_7$" between the two word sequences of "$S_1S_2$-$S_3S_4$-$S_5S_6$-$S_7$" and "$S_1S_2$-$S_3S_4S_5S_6$-$S_7$" as the optimal word sequence based on a selection algorithm. Which word sequence is specifically selected to be the optimal word sequence will depend on the selection algorithm adopted by the word sequence selection module. If a statistical algorithm is used, the one having the highest probability of occurrence among various word segmentation paths is selected. If the MMSEG word segmentation algorithm is used, the one having the largest matched term is selected. If more than one having the largest matched terms is found, then the one having the largest average length is selected. In any event, multiple word sequences may still remain at the end.

Based on the foregoing method, the word sequence "$S_1S_2$-$S_3S_4S_5S_6$-$S_7$" may be selected to be the optimal word sequence, for example. The search engine then conducts keyword searching.

The above segment of the text T, having only one source of ambiguity, has been used to illustrate the idea of the present scheme. For illustrative purpose only, an example of the present scheme will now be described below using a segment "$S_1S_2S_3S_4S_5S_6S_7S_8S_9S_a$" of the text T that has two sources of ambiguity, in which "$S_1S_2S_3S_4S_5$" can be segmented into "$S_1S_2S_3$-$S_4S_5$" and "$S_1S_2$-$S_3S_4S_5$" while "$S_6S_7S_8S_9S_a$" can be segmented into "$S_6S_7$-$S_8S_9S_a$" and "$S_6S_7S_8$-$S_9S_a$".

The interface of the search engine receives the segment "$S_1S_2S_3S_4S_5S_6S_7S_8S_9S_a$" of the text T.

The word segmentation processing module scans the segment of the text T from left to right once and compares the word groups in a lexicon (that has a tremendous number of pre-stored word groups) therewith. Matched word segmentation units "$S_1S_2$" and "$S_1S_2S_3$" are first added to two preliminary word sequence collections that have been pre-stored in a memory to obtain word sequences "$S_1S_2$" and "$S_1S_2S_3$" which are stored in two different storage areas of the memory. The word segmentation processing module then appends the word segmentation unit "$S_3S_4S_5$" to the word sequence "$S_1S_2$" to obtain "$S_1S_2$-$S_3S_4S_5$" and appends the word segmentation unit "$S_4S_5$" to "$S_1S_2S_3$" to obtain "$S_1S_2S_3$-$S_4S_5$". Upon finding that the last word of each of the newly appended word segmentation units "$S_3S_4S_5$" and "$S_4S_5$" is "$S_5$" (i.e., the fifth word in the text T), the word boundary determination module determines that the word sequences "$S_1S_2$-$S_3S_4S_5$" and "$S_1S_2S_3$-$S_4S_5$" are word sequences having a common word boundary. The word boundary determination module notifies the word sequence selection module to merge the word sequences "$S_1S_2$-$S_3S_4S_5$" and "$S_1S_2S_3$-$S_4S_5$". The word sequence selection module selects the word sequence "$S_1S_2$-$S_3S_4S_5$" between the word sequences "$S_1S_2$-$S_3S_4S_5$" and "$S_1S_2S_3$-$S_4S_5$" using the MMSEG word segmentation algorithm (or the statistical algorithm). Moreover, the memory space storing the word sequence "$S_1S_2S_3$-$S_4S_5$" is emptied at that time. Upon matching the word segmentation units "$S_6S_7$" and "$S_6S_7S_8$", the word segmentation processing module duplicates the word sequence "$S_1S_2$-$S_3S_4S_5$". Two equivalent word sequences "$S_1S_2$-$S_3S_4S_5$" are separately stored in two different storage areas of the memory. After appending the word segmentation units "$S_6S_7$" and "$S_6S_7S_8$" separately to the two equivalent word sequences "$S_1S_2$-$S_3S_4S_5$", word sequences "$S_1S_2$-$S_3S_4S_5$-$S_6S_7$" and "$S_1S_2$-$S_3S_4S_5$-$S_6S_7S_8$" are obtained. The word segmentation processing module obtains a match of the word segmentation unit "$S_8S_9S_a$" and appends this word segmentation unit "$S_8S_9S_a$" to the word sequence "$S_1S_2$-$S_3S_4S_5$-$S_6S_7$" to obtain a word sequence "$S_1S_2$-$S_3S_4S_5$-$S_6S_7$-$S_8S_9S_a$". The word segmentation processing module then obtains a match of the word segmentation unit "$S_9S_a$" and appends this word segmentation unit "$S_9S_a$" to the word sequence "$S_1S_2$-$S_3S_4S_5$-$S_6S_7S_8$" to obtain a word sequence "$S_1S_2$-$S_3S_4S_5$-$S_6S_7S_8$-$S_9S_a$". Upon finding that the last word of each of the newly added word segmentation units "$S_8S_9S_a$" and "$S_9S_a$" is "$S_a$" (i.e., the tenth word in the text T), the word boundary determination module determines that the word sequences "$S_1S_2$-$S_3S_4S_5$-$S_6S_7$-$S_8S_9S_a$" and "$S_1S_2$-$S_3S_4S_5$-$S_6S_7S_8$-$S_9S_a$" are word sequences having a common word boundary. The word boundary determination module notifies the word sequence selection module to merge the word sequences "$S_1S_2$-$S_3S_4S_5$-$S_6S_7$-$S_8S_9S_a$" and "$S_1S_2$-$S_3S_4S_5$-$S_6S_7S_8$-$S_9S_a$". The word sequence selection module selects the word sequence "$S_1S_2$-$S_3S_4S_5$-$S_6S_7$-$S_8S_9S_a$" between the two word sequences "$S_1S_2$-$S_3S_4S_5$-$S_6S_7$-$S_8S_9S_a$" and "$S_1S_2$-$S_3S_4S_5$-$S_6S_7S_8$-$S_9S_a$" using the MMSEG word segmentation algorithm (or the statistical algorithm). Moreover, the memory space storing the word sequence "$S_1S_2$-$S_3S_4S_5$-$S_6S_7S_8$-$S_9S_a$" is emptied at that time.

If more than two sources of ambiguity exist in the text T, the procedure similar to that for a segment of the text T is repeatedly performed. If the text T has three sources of ambiguity with each source of ambiguity creating two different word segmentation units, the procedure similar to that for a segment of the text T is repeatedly performed for three times. If existing technology is used here, an optimal word sequence will be selected from among eight sequences. On the other hand, the present exemplary method only performs selection of an optimal word sequence for three times with each selection being made between two word sequences, thus reducing computation load. Furthermore, if the lexicon has such terms as "比尔.盖茨", a word boundary will not be generated at the punctuation "•" in the middle of "比尔.盖茨" because word sequences prior to common word boundary/boundaries have been merged. Therefore, incorrect segmentation will not result.

In one embodiment, when the positions of the last words of the last word segmentation units obtained in word sequences are the same, these word sequences may not be merged immediately. For example, for the word sequences "$S_1S_2$-$S_3S_4S_5$-$S_6S_7$-$S_8S_9S_a$" and "$S_1S_2$-$S_3S_4S_5$-$S_6S_7S_8$-$S_9S_a$", word sequence merging is not performed for the word sequences "$S_1S_2$-$S_3S_4S_5$" and "$S_1S_2$-$S_3S_4S_5$" when these word sequences are obtained. Rather, word sequence merging is performed for the word sequences "$S_1S_2$-$S_3S_4S_5$-$S_6S_7$-$S_8S_9S_a$" and "$S_1S_2$-$S_3S_4S_5$-$S_6S_7S_8$-$S_9S_a$" when these word sequences are obtained.

In one embodiment, when a common word boundary appears among the obtained word sequences, word sequences after the common word boundary may be merged. The following example uses "$S_1S_2$-$S_3S_4S_5$-$S_6S_7$-$S_8S_9S_a$" and "$S_1S_2$-$S_3S_4S_5$-$S_6S_7S_8$-$S_9S_a$" as examples for illustration. Upon obtaining a common word boundary in the word sequences "$S_1S_2$-$S_3S_4S_5$-$S_6S_7$-$S_8S_9S_a$" and "$S_1S_2$-$S_3S_4S_5$-$S_6S_7S_8$-$S_9S_a$", word sequence merging is performed for word sequences "$S_6S_7$-$S_8S_9S_a$" and "$S_6S_7S_8$-$S_9S_a$" after the common word boundary.

The advantages of merging word sequences using a common word boundary are revisited herewith. As a word boundary is usually generated at a punctuation that serves as a division between sentences, shorter independent units can easily be obtained and computational load of word segmentation may thereby be reduced. If a term in a dictionary includes punctuation, a word boundary may not be generated at the punctuation, thus avoiding incorrect word segmentation. Moreover, any requirement for merging can be easily met. Word sequences may be merged as long as the same boundary exists on the right hand side of the word segmentation units in concern. Because the smallest units segmented by the word boundaries are independent, merging is performed among the smallest units for all word sequences. Not only is this reasonable, it is also plausible without ignoring any possibly correct word segmentations.

Figure 2:
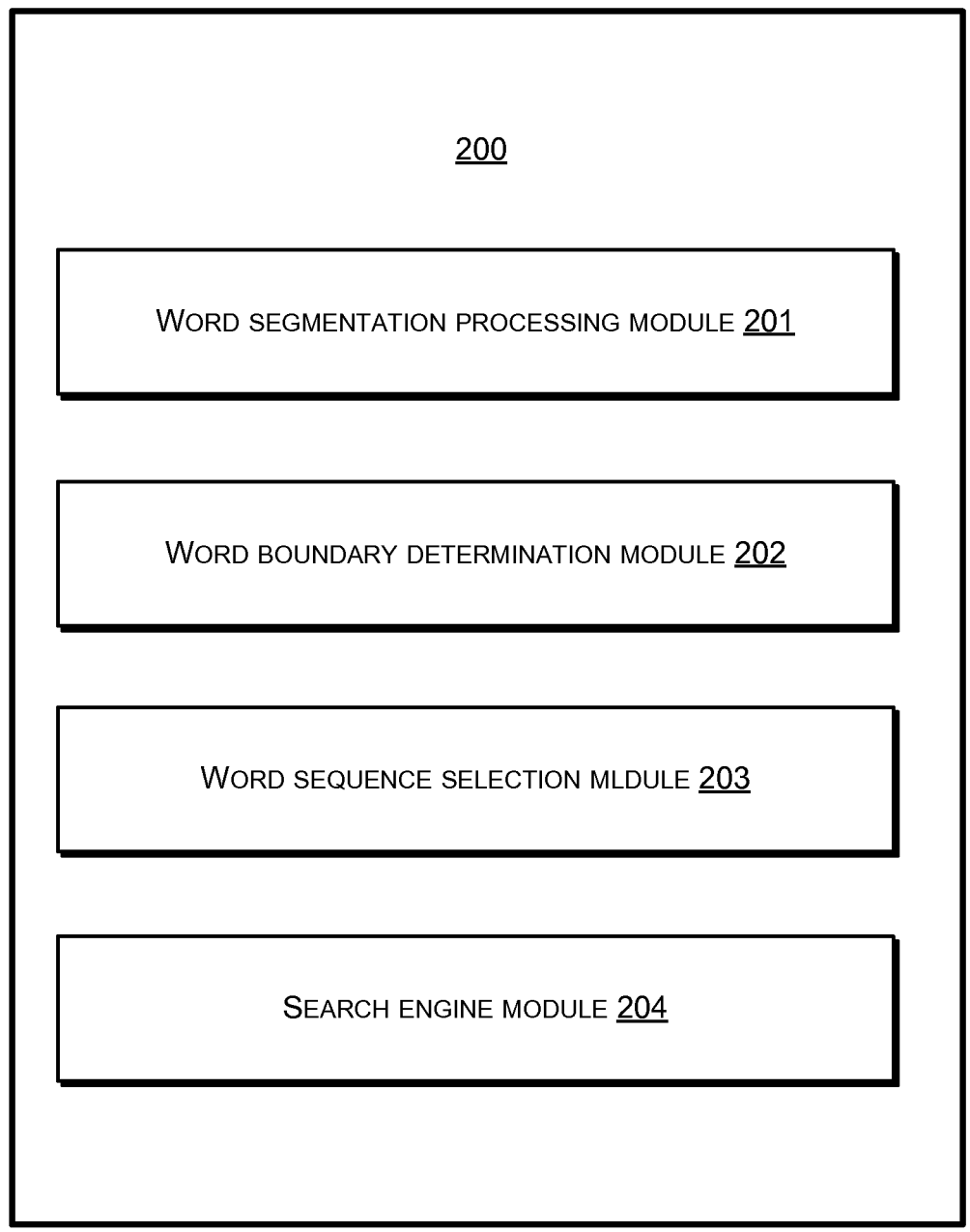
FIG. 2 shows a structural diagram of a process in accordance with one embodiment.

FIG. 2 illustrates a computer-implemented system 200 of selecting a word sequence for a text written in a language without word boundary marker. The system 200 includes:

a word segmentation processing module 201 that segments a segment of the text to obtain different word sequences, where each word sequence separately includes at least one word segmentation unit that is different from word segmentation units in other word sequences;

a word boundary determination module 202 that determines whether a position of a word boundary after a word segmentation unit in one word sequence is the same as a position of a word boundary after a word segmentation unit in another sequence, and recognizes the same positioned word boundary to be a common word boundary for the word sequences; and a word sequence selection module 203 that performs optimal word sequence selection for portions of the word sequences before the common word boundary, where the portions of the word sequences before the common word boundary separately includes at least one word segmentation unit that is different from word segmentation units in portions of other word sequences before the common word boundary.

In one embodiment, the word sequence selection module 203 is further configured to perform no further optimal word sequence selection in the event that no further common boundary exists after the common boundary. Otherwise, the word sequence selection module 203 continues the optimal word sequence selection after performing optimal word sequence selection for the portions of the word sequences before the common word boundary.

In one embodiment, the word segmentation processing module 201 is further configured to match a word string of the segment of the text against terms in a dictionary to obtain a word segmentation unit, add the word segmentation unit into a word sequence, and expand the word sequence into the different word sequences in the event that ambiguity exists in the word string and that multiple word segmentation units are needed to be added.

In one embodiment, the word segmentation processing module 201 is further configured to find matched terms in the dictionary word after word, and perform next matching starting from the second word of the matched term in the event that a matched term is found. Otherwise, the word segmentation processing module 201 performs the next matching starting from the first word of an unmatched word.

In one embodiment, the word segmentation processing module 201 is further configured to add the new word segmentation unit into that one word sequence in the event that a new word segmentation unit appears after all word segmentation unit of one word sequence, expand all existing word sequences, adding a new word sequence in the event that a new word segmentation unit does not appear after all word segmentation of any one word sequence, and add the new word segmentation unit into the new word sequence.

In one embodiment, the word boundary determination module 202 is further configured to determine, among various word sequences obtained after expanding the existing word sequences, that a word boundary is a common word boundary for the various word sequences upon finding that the last word of the new word segmentation unit obtained has the same word boundary.

In one embodiment, the word sequence selection module 203 is further configured to keep one or more word sequences after performing optimal word sequence selection.

In one embodiment, the system 200 further includes:
a search engine module that conducts a search based on an optimal word sequence having been selected.

For the ease of description, the various components of the system 200 are separately described as various modules functionally. It should be understood that, in the implementations of the various embodiments of the disclosed system and method, the functions of the various modules may be implemented in one or more software and/or hardware.

From the exemplary embodiments described above, a person of ordinary skill in the art can clearly understand that the disclosed method and system may be implemented using software and universal hardware platform, or can be implemented using hardware only. However, in many instances, the former implementation using a combination of software and hardware is preferred. Based on this understanding, the technical scheme of the present disclosure, or portions contributing to existing technologies, may be implemented in the form of software products which are stored in a storage media such as ROM/RAM, disk and drive. The software includes instructions for a computing device (e.g., personal computer, server or networked device) to execute the method described in various exemplary embodiments or a certain part of the exemplary embodiment of the current disclosure.

Of course, a person of ordinary skill in the art can alter or modify the present disclosure in many different ways without departing from the spirit and the scope of this disclosure. Accordingly, it is intended that the present disclosure covers all modifications and variations which fall within the scope of the claims of the present disclosure and their equivalents.

What is claimed is:

1. A computer-implemented method comprising:
   under control of one or more computing devices comprising one or more processors,
   receiving a text including multiple words;
   identifying multiple word segmentation units based on the multiple words;
   generating multiple word sequences by:

designating a word segmentation unit of the multiple word segmentation unit as a word sequence;

determining whether an additional word segmentation unit is after the word segmentation unit; and in an event that the additional word segmentation unit is not after the word segmentation unit, designating the additional word segmentation unit as an additional word sequence;

determining that a boundary position of a word sequence of the multiple word sequences is identical to a boundary position of an additional word sequence of the multiple word sequences, the boundary position indicating a boundary between two adjacent word segmentation units of the multiple word segmentation units; and merging the word sequence and the additional word sequence to generate a merged word sequence based on the boundary position.

2. The computer-implemented method of claim 1, further comprising:

performing a search based on one or more word segmentation units of the merged word sequence.

3. The computer-implemented method of claim 1, wherein the identifying the multiple word segmentation units based on the multiple words comprises:

determining whether a word of the multiple words matches with a term in a lexicon;

in an event that the word matches with the term in the lexicon:

determining the word as a word segmentation unit, and determining whether a combination of the word and a word adjacent to the word matches with one term in the lexicon; and in an event that the word does not match with the term in the lexicon, determining whether a word adjacent to the word match with one term in a lexicon.

4. The computer-implemented method of claim 1, where the generating the multiple word sequences comprises generating the multiple word sequences by further:

in an event that the additional word segmentation unit is after the word segmentation unit, appending the additional word segmentation unit to the word sequence.

5. The computer-implemented method of claim 1, wherein the merging the word sequence and the additional word sequence to generate the merged word sequence based on the boundary position comprises selecting one of the word sequence and the additional word sequence as the merged word sequence based on the boundary position using at least one of a maximum matching algorithm or a statistical algorithm.

6. The computer-implemented method of claim 1, wherein portions of the word sequence and the additional word sequence that are before the boundary position have at least one different word segmentation unit.

7. The computer-implemented method of claim 1, wherein the word sequence and the additional word sequence are maintained in memory before the merging the word sequence and the additional word sequence.

8. One or more non-transitory computer-readable storage media comprising computer executable instructions that, when executed by one or more computer processors, performs acts comprising:

conducting a word matching process on a text to identify multiple word segmentation units;

designating a word segmentation unit of the multiple word segmentation units as a word sequence;

generating multiple word sequences by:

designating a word segmentation unit of the multiple word segmentation unit as a word sequence;

determining whether an additional word segmentation unit of the multiple word segmentation units is after the word segmentation unit, in an event that the additional word segmentation unit is after the word segmentation unit, appending the additional word segmentation unit to the word sequence, and in an event that the additional word segmentation unit is not after the word segmentation unit, designating the additional word segmentation unit as an additional word sequence;

determining that a word segmentation boundary position of the word sequence is identical to a word segmentation boundary position of one word sequence of the multiple word sequences; and merging the word sequence and the one word sequence to generate a merged word sequence based on the word segmentation boundary position.

9. The one or more non-transitory computer-readable storage media of 8, wherein the acts further comprise:

receiving a search query including the text; and performing a search based on one or more word segmentation units included in the merged word sequence.

10. The one or more non-transitory computer-readable storage media of 8, wherein the text includes multiple words, and the conducting the word matching process on the text comprises:

determining whether a word of the multiple words matches with a term in a lexicon;

in an event that the word matches with the term in the lexicon:

determining the word as a word segmentation unit, and determining whether a combination of the word and a word adjacent to the word matches with one term in the lexicon; and in an event that the word does not match with the term in the lexicon, determining whether a word adjacent to the word matches with one term in the lexicon.

11. The one or more non-transitory computer-readable storage media of 8, wherein the merging the word sequence and the one word sequence to generate the merged word sequence based on the word segmentation boundary position comprises selecting one of the word sequence and the one word sequence as the merged word sequence using a maximum matching algorithm.

12. The one or more non-transitory computer-readable storage media of 8, wherein the merging the word sequence and the one word sequence to generate the merged word sequence based on the word segmentation boundary position comprises selecting one of the word sequence and the one word sequence as the merged word sequence using a statistical algorithm.

13. The one or more non-transitory computer-readable storage media of 8, wherein portions of the word sequence and the one word sequence that are before the word segmentation boundary position have at least one different word segmentation unit.

14. The one or more non-transitory computer-readable storage media of 8, wherein the word sequence and the one word sequence are maintained in memory before the merging the word sequence and the one word sequence.

15. The one or more non-transitory computer-readable storage media of 8, wherein the word segmentation boundary position indicates a boundary between two adjacent word segmentation units of the multiple word segmentation units.

16. A computing device comprising:
one or more processors; and
memory to maintain a plurality of components executable by the one or more processors, the plurality of components comprising:
  a word segmentation processing module that:
    identifies multiple word segmentation units based on a text including multiple words, and
    generating multiple word sequences by:
      designating a word segmentation unit of the multiple word segmentation unit as a word sequence;
      determining whether an additional word segmentation unit is after the word segmentation unit; and
      in an event that the additional word segmentation unit is not after the word segmentation unit, designating the additional word segmentation unit as an additional word sequence,
  a word boundary determination module that determines that a boundary position of a word sequence of the multiple word sequences is identical to a boundary position of an additional word sequence of the multiple word sequences, the boundary position indicating a boundary between two adjacent word segmentation units of the multiple word segmentation units; and
  a word sequence selection module that merges the word sequence and the additional word sequence to generate a merged word sequence based on the boundary position.

17. The computing device of claim 16, further comprising a search engine module that:
  receives a search query including the text; and
  performs a search based on one or more word segmentation units included in the merged word sequence.

18. The computing device of claim 16, wherein the identifying the multiple word segmentation units based on the multiple words comprises:
  determining whether a word of the multiple words matches with a term in a lexicon;
  in an event that the word matches with the term in the lexicon:
    determining the word as a word segmentation unit, and
    determining whether a combination of the word and a word adjacent to the word matches with one term in the lexicon; and
  in an event that the word does not match with the term in the lexicon, determining whether a word adjacent to the word matches with one term in the lexicon.

19. The computing device of claim 16, where the generating the multiple word sequences comprises generating the multiple word sequences by further:
  in an event that the additional word segmentation unit is after the word segmentation unit, appending the additional word segmentation unit to the word sequence.

20. The computing device of claim 16, wherein the merging the word sequence and the additional word sequence to generate the merged word sequence based on the boundary position comprises selecting one of the word sequence and the additional word sequence as the merged word sequence using at least one of a maximum matching algorithm or a statistical algorithm.

* * * * *